(12) United States Patent
Hoschke

(10) Patent No.: US 11,571,914 B2
(45) Date of Patent: Feb. 7, 2023

(54) METHOD OF PRINTING USING OVERLAPPING PRINTHEAD SEGMENTS

(71) Applicant: Memjet Technology Limited, Dublin (IE)

(72) Inventor: Nigel Hoschke, North Ryde (AU)

(73) Assignee: Memjet Technology Limited

( * ) Notice: Subject to any disclaimer, the term of this patent is extended or adjusted under 35 U.S.C. 154(b) by 0 days.

(21) Appl. No.: 17/505,502

(22) Filed: Oct. 19, 2021

(65) Prior Publication Data

US 2022/0118773 A1 Apr. 21, 2022

Related U.S. Application Data

(60) Provisional application No. 63/094,085, filed on Oct. 20, 2020.

(51) Int. Cl.
  *B41J 2/045* (2006.01)
  *B41J 3/54* (2006.01)
  *B41J 2/21* (2006.01)
  *B41J 19/14* (2006.01)

(52) U.S. Cl.
  CPC ........... *B41J 3/543* (2013.01); *B41J 2/04505* (2013.01); *B41J 2/04518* (2013.01); *B41J 2/2132* (2013.01); *B41J 19/145* (2013.01)

(58) Field of Classification Search
  CPC .......... B41J 2/04505; B41J 2/04508; B41J 2/04526; B41J 2/04535; B41J 2/04543; B41J 2/04545; B41J 2/04546; B41J 2/04595; B41J 2/04593; B41J 3/543; B41J 19/145; B41J 2/04518; B41J 2/2132; B41J 2/2146; G06K 15/107
  See application file for complete search history.

(56) References Cited

U.S. PATENT DOCUMENTS 7,445,302 B2 * 11/2008 Edwards ................ B41J 19/142
  347/19
2010/0165015 A1 * 7/2010 Barkley ................ B41J 2/2139
  347/1

FOREIGN PATENT DOCUMENTS

JP  2006255958  *  9/2006  ............. B41J 2/44
WO WO-03071439 A1 *  8/2003  ............ B41J 2/2135

* cited by examiner

*Primary Examiner* — Kristal Feggins
(74) *Attorney, Agent, or Firm* — Cooley LLP

(57) ABSTRACT

A method of printing an image using a printing system including at least first and second overlapping printhead segments, the method includes the steps of: feeding media past the printhead segments along a media feed direction; determining an extent of wander of the media in a direction perpendicular to the media feed direction; selecting a stitching method based on the determined extent of wander; and printing the image using the first and second printhead segments. The printing step includes stitching the first and second printhead segments using the selected stitching method.

20 Claims, 3 Drawing Sheets

METHOD OF PRINTING USING OVERLAPPING PRINTHEAD SEGMENTS

CROSS REFERENCE TO RELATED APPLICATIONS

This application claims priority to and the benefit of U.S. Provisional Patent Application No. 63/094,085, entitled METHOD OF PRINTING USING OVERLAPPING PRINTHEAD SEGMENTS, filed on Oct. 20, 2020, the disclosure of which is incorporated herein by reference in its entirety for all purposes.

FIELD OF THE INVENTION

The present invention relates generally to printing systems having overlapping printhead segments. It has been developed primarily for minimizing stitching artefacts in overlap regions.

BACKGROUND

Pagewide printing dramatically increases print speeds compared to traditional scanning printheads. Many types of pagewide printers use overlapping printhead segments to form a pagewide array configured for printing over a required media width. For example, the Applicant's wide-format pagewide printers described in WO2011/011824 use a staggered overlapping array of multi-color A4-sized printheads, which extend across wideformat media. The Applicant's modular printing systems described in, for example, U.S. Pat. No. 10,081,204 use multiple monochrome pagewide print bars, each print bar having a staggered overlapping array of monochrome printheads ("print modules"). Other pagewide printers, such as those described in U.S. Pat. No. 8,662,636 use a staggered overlapping array of printhead chips to form a pagewide printhead. In the present context, the term "printhead segment" encompasses both printhead chips and printheads (or print modules) comprised of multiple printhead chips.

A problem with overlapping printhead segments is that pairs of neighbouring printhead segments must be stitched together in their overlap regions. As used herein, the term "stitching" refers to any method by which image content is printed from a pair of overlapping printhead segments. Whatever stitching method is used, print artefacts may result from the stitching, typically in the form of a light or dark streak down the page.

In its simplest form, butt joins may be used for stitching, whereby one printhead segment prints image content on one side of a fixed stitch point and a neighbouring overlapping printhead segment prints image content on the other side of the fixed stitch point. Test prints may be used to select the position of the fixed stitch point in the overlap region and thereby provide the least objectionable print artefacts.

U.S. Pat. No. 7,331,646, the contents of which are incorporated herein by reference, describes a stitching method whereby printing is shared between the overlapping printhead segments in the overlap region. Typically, printing is faded from one printhead to the other across the overlap region, in accordance with a dedicated overlap dither. This type of is stitching is sometimes referred to in the art as "feathering".

The prior art has generally focused on various types of overlap dither in an attempt to improve stitching and minimize print artefacts. One example of a more sophisticated stitching technique based on image content is described in U.S. Pat. No. 10,293,622, the contents of which are incorporated herein by reference. In the described method, a seam carving algorithm is used to define a continuous seam which meanders through regions of low intensity in the image (e.g. between text lines). Furthermore, foreground images (e.g. text) may be stitched using butt stitches, while background images (e.g. contone) may be stitched using a feathered stitch.

With the commercial growth of pagewide printers having overlapping printheads and/or printhead chips, and particularly in view of customers' sensitivity to print quality in many market segments, it would be desirable to improve methods of stitching so as to reduce noticeable stitching artefacts and optimize overall print quality.

SUMMARY OF INVENTION

In a first aspect, there is provided a method of printing an image using a printing system comprising at least first and second overlapping printhead segments, the method comprising the steps of:
(i) feeding media past the printhead segments along a media feed direction
(ii) determining an extent of wander of the media in a direction perpendicular to the media feed direction;
(iii) selecting a stitching method based on the determined extent of wander; and
(iv) printing the image using the first and second printhead segments, the printing comprising stitching the first and second printhead segments using the selected stitching method.

In a second aspect, there is provided a printing system comprising:
(A) a printer comprising at least first and second overlapping printhead segments;
(B) a sensor for determining an extent of wander of media fed past the printhead segments, the extent of wander being defined in a direction perpendicular to the media feed direction; and
(C) a processor configured for performing the steps of:
(a) selecting a stitching method based on the determined extent of wander; and
(b) generating dot data for printing an image using the first and second printhead segments,
wherein the dot data is generated based on the selected stitching method.

Preferred embodiments are described hereinbelow in the appended claims.

As used herein, the term "seam" refers to a set of contiguous stitch points, each stitch point having a predetermined position for each row of print. Typically, a set of fixed-position stitch points defines a linear seam and a pair of overlapping printhead segments stitch across the linear seam.

As used herein, the term "ink" refers to any ejectable fluid and may include, for example, conventional CMYK inks (e.g. pigment and dye-based inks), infrared inks, UV-curable inks, fixatives, primers, binders, 3D printing fluids, polymers, biological fluids etc. the present invention is particularly suitable for use in high particulate environments such as 3D printers and, accordingly, the term "ink" explicitly includes any ejectable fluid used in 3D printing applications.

BRIEF DESCRIPTION OF THE DRAWINGS

One or more embodiments of the present invention will now be described with reference to the drawings, in which.

DETAILED DESCRIPTION

Figure 1:
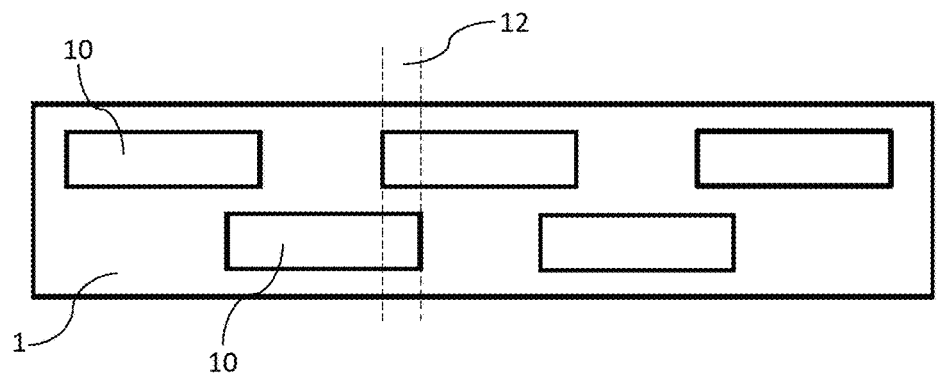
FIG. 1 shows schematically a print bar having five overlapping printheads.

Referring to FIG. 1, there is shown schematically a print bar 1 comprising a fixed array of five overlapping printhead segments. Each printhead segment takes the form of an elongate inkjet printhead 10 (e.g. A4-sized printhead) having rows of nozzles (not shown) for ejection of ink. In FIG. 1, the five printheads are nominally designated Printhead 1, Printhead 2, Printhead 3 etc from left to right. In the print bar 1 shown in FIG. 1, the printheads 10 are all monochrome printheads, although it will of course be appreciated that multi-color printheads are within the ambit of the present disclosure.

Neighbouring overlapping printheads 10 have an overlap region 12 whereby nozzles from either of the overlapping printheads may be used to print a strip of an image corresponding to the overlap region. In these overlap regions 12, the neighbouring printheads 10 must be stitched together to avoid discontinuities in the printed image.

One prior art stitching method (known in the art as "butt joins") simply sets a fixed stitch point in the overlap region 12 and allocates printing to printheads at either side of the fixed stitch point.

Figure 2:
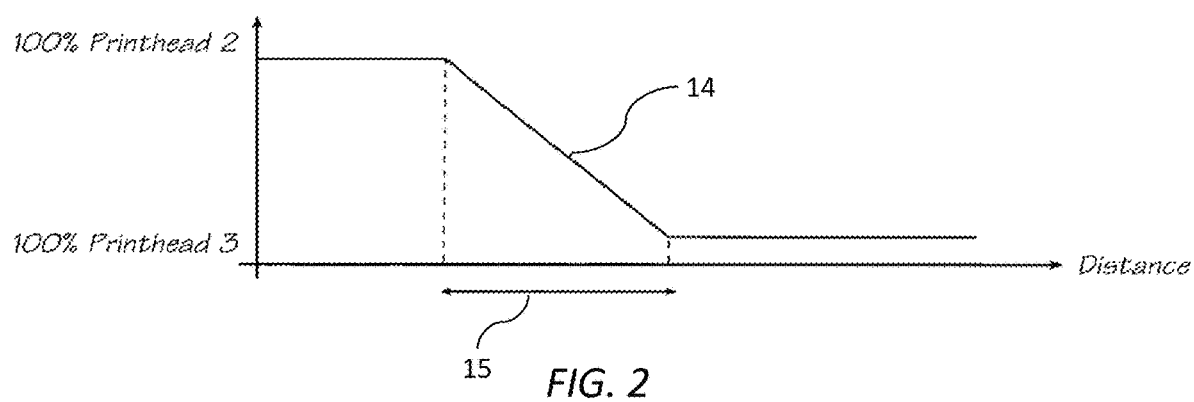
FIG. 2 shows a method of fading print output from one printhead to another.
Figure 3:
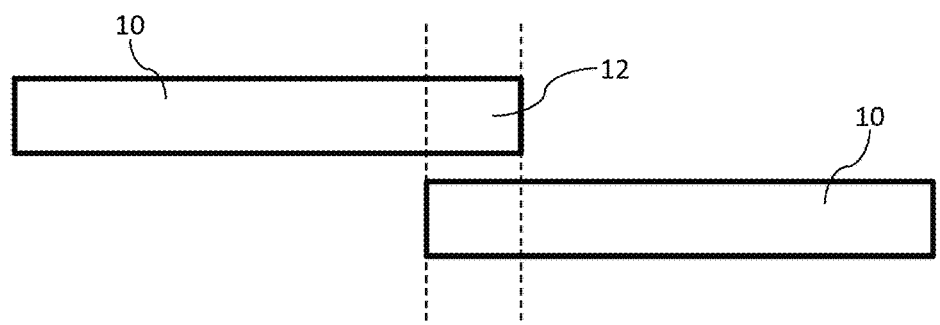
FIG. 3 shows schematically a printer having two overlapping printheads with an overlap region.

FIG. 2 illustrates another prior art stitching method for printing in the overlap region 12. In this stitching method, printing is shared between, for example, Printhead 2 and Printhead 3 across the overlap region 12 by means of a suitable overlap dither. In its simplest form, the overlap dither linearly fades ("feathers") printing across the overlap region from Printhead 2 to Printhead 3. At a nominal stitch point 14 halfway across the overlap region 12, Printhead 2 and Printhead 3 share printing roughly equally. Although FIG. 2 shows a linear transition across the overlap region, it will be appreciated that non-linear transitions, such as sinusoidal fade gradients, may also be used.

Although the width of the overlap region 12 shown in FIG. 1 is fixed due to the positioning of the printhead segments 10, the width of the stitching zone 15 used in feathered stitching may not necessarily employ all overlapping nozzles in the overlap region.

As foreshadowed above, such stitching methods do not always provide acceptable print quality. For example, unpredictable dot-on-dot printing in the overlap region 12 caused by slight misalignments of the printheads 10 may cause noticeable print artefacts.

The feathered stitching method described above in connection with FIG. 2 may be improved empirically from user feedback. For example, if stitching artefacts are particularly visible from a test print, in the form of either a light of dark streak down a page, this information may be fed back to a controller and the overlap dither adjusted appropriately. For example, the controller may adjust the overlap dither so as to reduce or increase the dot density in the overlap region, as appropriate.

Reliance on user feedback to optimize image quality and minimize stitching artefacts is undesirable. Firstly, image quality is subjective and different users may have different perceptions of what they find most desirable in terms of image quality. Secondly, users find it inconvenient to print and compare multiple test images in order to identify an optimum image; there is an expectation that a printing system will produce optimum print quality all the time. Thirdly, stitching artefacts may vary with different printed images and, therefore, an optimized overlap dither for one image may not be optimized for another image.

Accordingly, the method described herein optimizes image quality in overlap regions and may be performed, if desired, without relying on user feedback. In high-speed, pagewide printing systems, it has been found that print artefacts in overlap regions are dependent, to a large extent, on the extent of wander of the print media in a direction perpendicular to the feed direction (i.e. along a direction parallel with a longitudinal axis of the printhead(s)). With a high-quality media feed mechanism, the extent of wander is relatively small and optimal image quality is achieved using butt stitches between the printhead segments. However, with a lower quality media feed mechanism, the extent of wander is greater and optimal image quality is achieved using feathered stitches between the printhead segments. Therefore, determining the extent of wander allows the printing system to be automatedly configured for optimum print quality. For example, if the extent of wander is below a predetermined threshold (e.g. 1, 2 or 3 dot pitches), then the selected stitching method is butt stitching; if the extent of wander is at or above the predetermined threshold, then the selected stitching method is feathered stitching. The same selected stitching method is typically applied to all printheads in a printing system.

The predetermined threshold may be set depending on a number of factors, such as print resolution; dot size; image content; dot gain; media type; and ink type. Typically, the threshold is set to a number of dot pitches and the extent of wander is determined in terms of a number of dot pitches along an axis parallel to the longitudinal axis of the printhead.

If feathered stitching is selected, then the width of the stitching zone 15 may be varied for optimal print quality. Typically, the width of the stitching zone 15 is based on the extent of wander. With a relatively greater amount of wander, the stitching zone is relatively wider; and with a relatively smaller amount of wander, the stitching zone is relatively narrower. It will be appreciated that as the width of the stitching zone 15 is decreased towards zero, the feathered stitch degenerates into a butt stitch. In other words, and with reference to FIG. 2, the slope of the transition from one printhead to a neighboring overlapping printhead becomes steeper as the width of the stitching zone 15 decreases. Eventually, the slope of this transition becomes vertical as the width of the stitching zone 15 becomes zero and the overlapping printheads are butt stitched.

Figure 4:
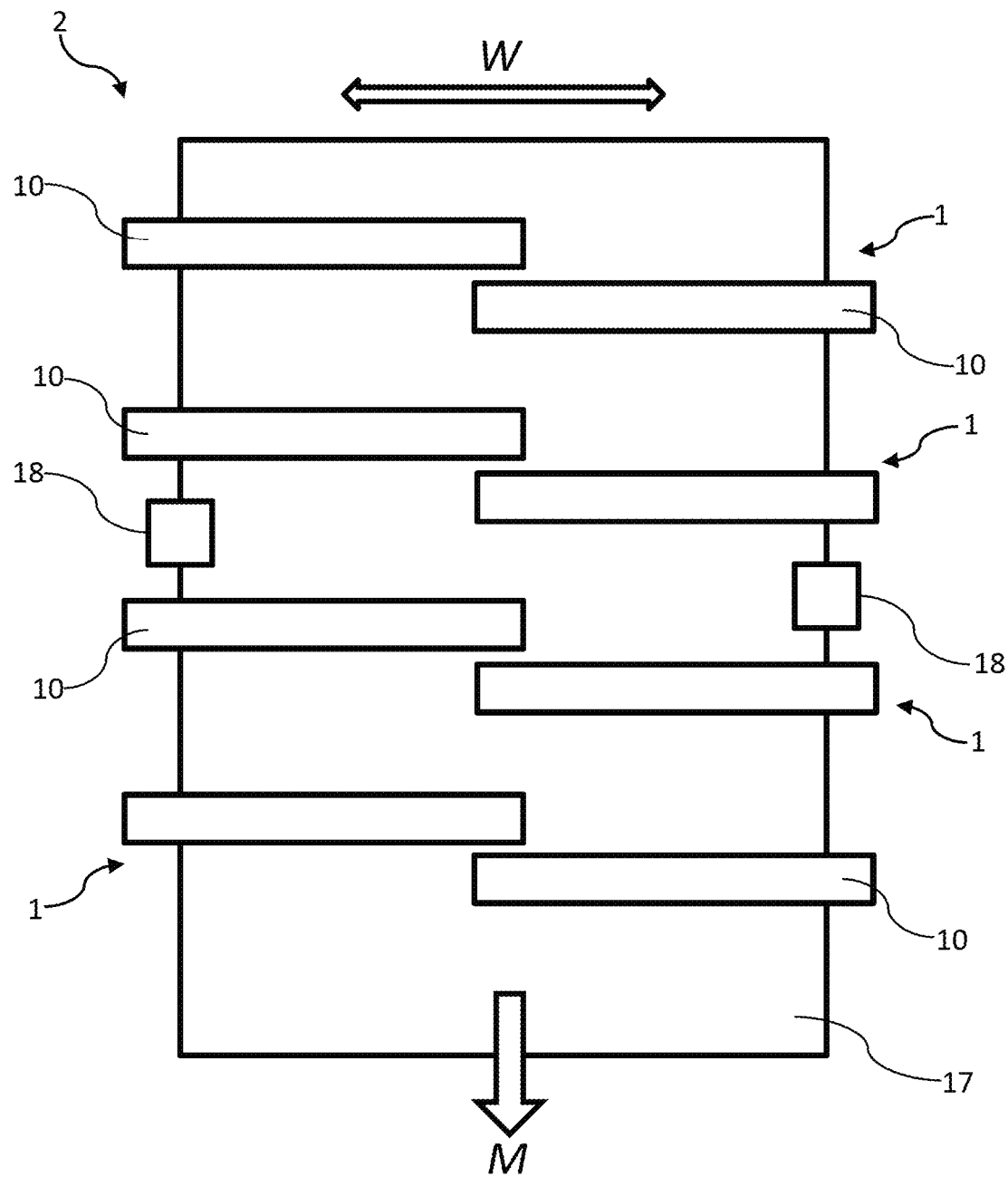
FIG. 4 shows schematically a printing system having inline sensors for determining an extent of wander.
Figure 5:
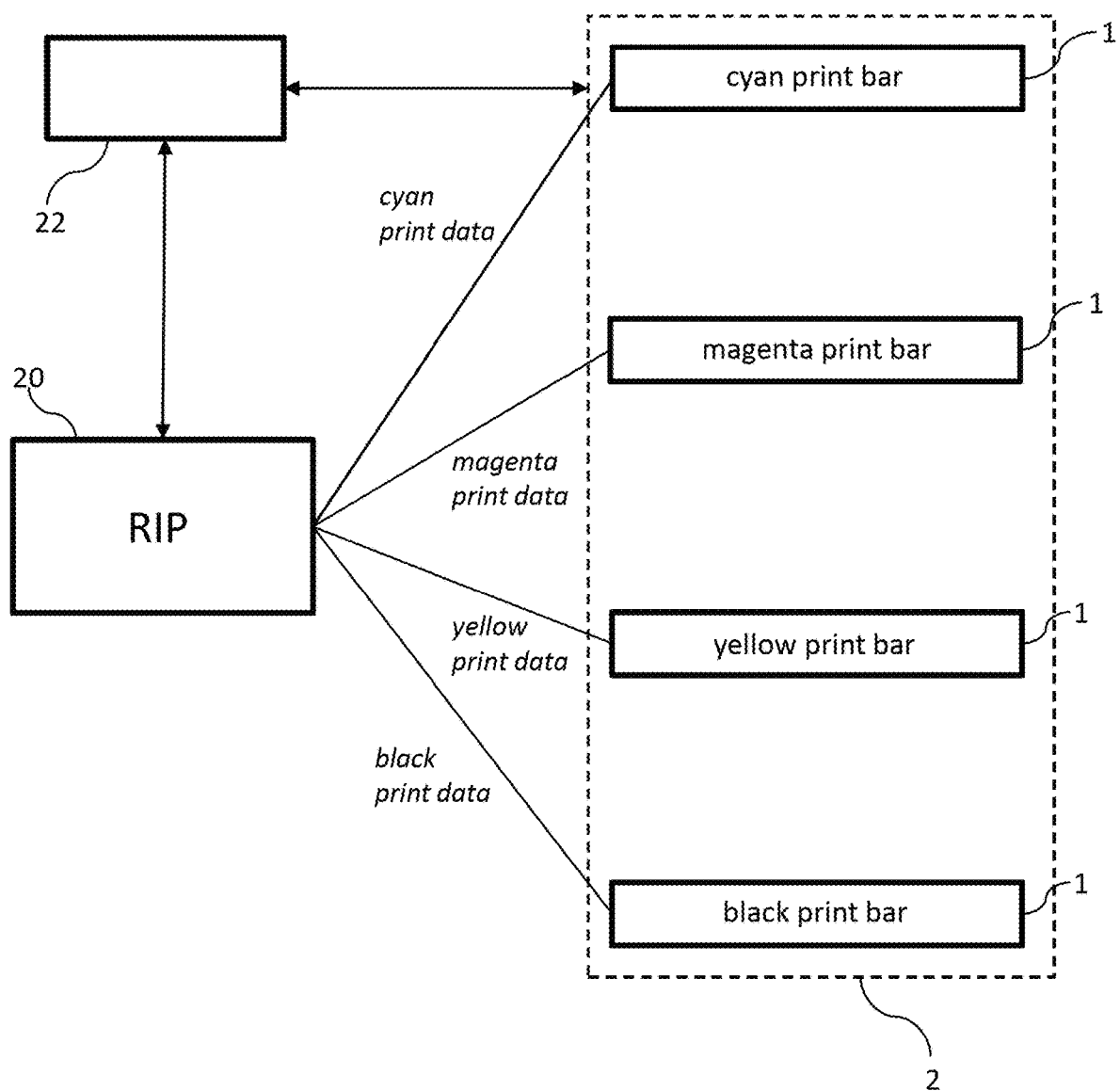
FIG. 5 shows schematically a data architecture for sending print data to an array of printheads.

FIGS. 4 and 5 show schematically an example of a printing system 2 configured for implementing the methods described herein. In FIG. 4, a media web 17 is fed past a plurality of print bars 1, each print bar comprising a pair of overlapping printhead segments 10 in the form of fixed printheads, such as those described in U.S. Pat. No. 10,071,562, the contents of which are incorporated herein by reference. Optical sensors 18 are positioned for sensing an extent of wander (indicated by double-headed arrow W) of the media web 17 as it is fed past the print bars 1 in a media feed direction indicated by arrow M. As shown in FIG. 4, the optical sensors 18 are positioned for optically sensing opposite edges of the media web 17. Alternatively, the optical sensors 18 sense fiducials on the media web 17, or inherent textural features in the media web (using, for example, an optical mouse-type sensor). The skilled person will be readily aware of these and other sensors for determining an extent of wander.

The determined extent of wander is used to select a suitable stitching method, for example, with reference to a predetermined threshold for the printing system 2. Turning to FIG. 5, a raster image processor ("RIP") 20 is configured to generate halftone print data using the selected stitching method and deliver the print data ("dot data") to multiple monochrome print bars 1 of the printing system 2. Each of the print bars 10 shown in FIG. 5 comprises a pair of overlapping printheads 10, as shown in FIG. 4.

Print data is allocated to each printhead 10 of each print bar 1 in accordance with the selected stitching method. The print data generated by the RIP 20 for each color channel is supplied to the print bars 1 for printing. Typically, additional processing of the print data (e.g. dead nozzle compensation, keep-wet spitting etc) is performed before the image is printed by one or more intervening processors (not shown). Further, a supervisor controller 22 communicates with the printing system 2 and the RIP 20, enabling the RIP to implement the selected stitching method based on the determined extent of wander in the media web 17. Various image processing and printing system architectures will be well known to the person skilled in the art, and the methods described herein are not limited to any particular type of architecture.

The foregoing describes only some embodiments of the present invention, and modifications of detail may be made thereto without departing from the scope of the invention, the embodiments being illustrative and not restrictive.

The invention claimed is:

1. A method of printing an image using a printing system comprising at least first and second overlapping printhead segments, the method comprising the steps of:
   (i) feeding media past the printhead segments along a media feed direction
   (ii) determining an extent of wander of the media in a direction perpendicular to the media feed direction;
   (iii) selecting a stitching method based on the determined extent of wander; and
   (iv) printing the image using the first and second printhead segments, the printing comprising stitching the first and second printhead segments using the selected stitching method.

2. The method of claim 1, wherein a first stitching method is selected if the extent of wander is below a predetermined threshold.

3. The method of claim 2, wherein the predetermined threshold is based on at least one parameter selected from the group consisting of: print resolution; dot size; dot gain; image content; media type; and ink type.

4. The method of claim 2, wherein the first stitching method comprises butt stitching whereby only nozzles from the first printhead segment print at a first side of a stitch point and only nozzles from the second printhead segment print at a second side of the stitch point, the stitch point being positioned within an overlap region of the first and second printhead segments.

5. The method of claim 4, wherein a plurality of stitch points for sequential rows of print together define either: (a) a linear seam having a fixed position within the overlap region; or (b) a continuous seam having a varying position within the overlap region.

6. The method of claim 1, wherein the selected stitching method comprises feathered stitching whereby nozzles from both the first and second printhead segments print across a stitching zone containing overlapping nozzles of the first and second printhead segments.

7. The method of claim 6, wherein the feathered stitching uses a fade transition from the first printhead segment to the second printhead segment.

8. The method of claim 7, wherein the fade transition is selected from the group consisting of: a sinusoidal fade and a linear fade.

9. The method of claim 8, wherein the sensor is an optical image sensor configured for sensing at least one of: an edge of the media; fiducials of a test image printed on the media; and textural features of the media.

10. The method of claim 6, wherein a width of the stitching zone is based on the determined extent of wander.

11. The method of claim 10, wherein a relatively wider stitching zone is used for relatively greater amount of wander and a relatively narrower stitching zone is used for a relatively smaller amount of wander.

12. The method of claim 1, wherein the extent of wander is determined using a sensor.

13. A printing system comprising:
   (A) a printer comprising at least first and second overlapping printhead segments;
   (B) a sensor for determining an extent of wander of media fed past the printhead segments, the extent of wander being defined in a direction perpendicular to the media feed direction; and
   (C) a processor configured for performing the steps of:
      (a) selecting a stitching method based on the determined extent of wander; and
      (b) generating dot data for printing an image using the first and second printhead segments,
wherein the dot data is generated based on the selected stitching method.

14. The printing system of claim 13, wherein a first stitching method is selected if the extent of wander is below a predetermined threshold.

15. The method of claim 13, wherein the first stitching method comprises butt stitching whereby only nozzles from the first printhead segment print at a first side of a stitch point and only nozzles from the second printhead segment print a second side of the stitch point, the stitch point being positioned within an overlap region of the first and second printhead segments.

16. The printing system of claim 13, wherein the selected stitching method comprises feathered stitching whereby nozzles from both the first and second printhead segments print across a stitching zone containing overlapping nozzles of the first and second printhead segments.

17. The method of claim 16, wherein a width of the stitching zone is based on the determined extent of wander.

18. The method of claim 17, wherein a relatively wider stitching zone is used for relatively greater amount of wander and a relatively narrower stitching zone is used for a relatively smaller amount of wander.

19. The printing system of claim 13, wherein the sensor is an optical image sensor configured for sensing at least one of: an edge of the media; fiducials of a test image printed on the media; and textural features of the media.

20. The printing system of claim 13, wherein the sensor is selected from the group consisting of: an inline sensor positioned for sensing media fed past the printhead segments; and a standalone sensor for sensing fiducials of a printed test image.

\* \* \* \* \*